United States Patent Office 3,562,328
Patented Feb. 9, 1971

3,562,328
PROCESS FOR THE PRODUCTION OF CYCLOHEXANONE OXIME
Eizo Yasui, Takeo Kawaguchi, Takashi Matsubara, and Toshiro Hirose, Nagoya-shi, Japan, assignors to Toa Gosei Chemical Industry Co., Ltd., Tokyo, Japan
No Drawing. Filed Feb. 28, 1967, Ser. No. 619,182
Claims priority, application Japan, Feb. 28, 1966, 41/11,645; Mar. 18, 1966, 41/16,569
Int. Cl. C07c 171/00
U.S. Cl. 260—566  14 Claims

ABSTRACT OF THE DISCLOSURE

A process for producing cyclohexanone oxime by the oxidation of cyclohexanone in the presence of ammonia and hydrogen peroxide using as a catalyst tungstic acid, isopolytungstic acid, heteropolytungstic acid or a salt thereof. The oxidation is conducted in the presence of a soluble tin compound or a polyhydric alcohol, preferably, in an aqueous medium at normal pressure and at temperature of 5–50° C. to improve the yield for cyclohexanone oxime and prevent the insolubilization of the catalyst under the reaction conditions. The yield of cyclohexanone oxime is about 92%.

BACKGROUND OF THE INVENTION (1) Field of the invention

The present invention relates to a process for the production of cyclohexanone oxime by the ammoxidation of cyclohexanone and more particularly to an improved process for the production of cyclohexanone oxime by the oxidation of cyclohexanone with hydrogen peroxide in the presence of ammonia using as the catalyst tungstic acid or a derivative thereof.

(2) Description of the prior art

A process for the production of cyclohexanone oxime by the ammoxidation of cyclohexanone with hydrogen peroxide and ammonia using as the catalyst sodium tungstate is known. See Chemical Abstracts, vol. 55, 1473a. However, in this process the conversion ratio of cyclohexanone and the yield for cyclooxime are low. Further, in the course of the reaction, a part of the catalyst is converted into a tungsten compound which is insoluble in the reaction liquid. This reduces the effective catalyst concentration in the reaction liquid and, hence, the conversion ratio of cyclohexanone and the yield for cyclohexanone oximes are at most 70% and 70%, respectively.

Therefore, an object of the present invention is to provide a process for the production of cyclohexanone oxime by the ammoxidation of cyclohexanone with hydrogen peroxide and ammonia using as the catalyst tungstic acid or a derivative thereof, while preventing the precipitation of the catalyst in the reaction system and effectively utilizing the catalyst.

Another object of this invention is to provide a process for obtaining cyclohexanone oxime by the ammoxidation of cyclohexanone with a higher yield than those obtained by the known, conventional process.

Still another object of this invention is to provide a high conversion ratio of cyclohexanone into cyclohexanone oxime in a comparatively short period of time without reducing the selectivity of the reaction.

By the process of this invention, the production of cyclohexanone oxime can be conducted not only without the aforesaid faults in the known method in which tungstic acid and the like is used as the catalyst, but also without the faults of the process disclosed in the prior patent application of the same applicant (U.S. patent application 524,493; British patent application 4,849/'66; German patent application T 30,410, IVb/12.0; French patent application 49,193/'66; or Italian patent application 32,174/'66) in which cyclohexanone oxime is produced by the ammoxidation of cyclohexanone with hydrogen peroxide and ammonia using heteropolytungstic acid as the catalyst. In the ammoxidation of cyclohexanone using a heteropolytungstic acid or a salt thereof as the catalyst, the yield for cyclohexanone oxime is higher than that in the reaction in which a simple sodium tungstate is used as the catalyst, but if the concentration of cyclohexanone in the reaction system is increased to improve the productivity of the process, the heteropolytungstic acid is converted into an insoluble tungsten compound, which is precipitated. Hence, the effective catalyst concentration is suddenly decreased and the rate of reaction of cyclohexanone is lowered.

According to the present invention the precipitation out of the reaction system of the catalyst, such as, tungstic acid, isopolytungstic acid, heteropolytungstic acid, or a salt thereof, under the usual reaction conditions can be prevented. Further, tungstic acid and salts thereof which are more easily precipitated than the heteropolytungstate can be effectively used in the reaction. Furthermore, according to the present invention the insolubilization of the catalyst during reaction does not occur and therefore, it is possible to provide a very large amount of the catalyst component in the active state in the reaction liquid.

SUMMARY OF THE INVENTION

The above objects of the present invention can be achieved according to the present invention by conducting the ammoxidation of cyclohexanone with ammonia and hydrogen peroxide using as the catalyst, e.g., tungstic acid or a derivative thereof in the presence of a tin-containing compound soluble in water or in an aqueous solution of ammonia, or in the presence of "a polyhydroxy alkane having hydroxyl groups at adjacent carbon atoms and containing from 2–6 carbon atoms." The reaction of this invention may be particularly profitably conducted at a temperature of 5–50° C. in a reaction system containing water, cyclohexanone, ammonia, hydrogen peroxide and catalysts, wherein ammonia is present in excess of the amount required theoretically, and hydrogen peroxide is present in an amount of 0.5–2.5 mols of hydrogen peroxide per one mol of cyclohexanone.

Thus, the feature of the process of this invention is in the use of a tin-containing compound soluble in water or in an aqueous solution of ammonia, or in the use of an alcohol having hydroxyl groups at an adjacent carbon atom in a process for the ammoxidation of cyclohexanone using as the catalyst, tungstic acid or a derivative thereof. Although the action and mechanism by which the precipitation of the catalyst is prevented in the process are not clear, the conversion ratio of cyclohexanone and the yield for cyclohexanone oxime can be increased up to 88% and 82% respectively while those in the known process for the ammoxidation of cyclohexanone, using only tungstic acid as the catalyst, are only 65% and 69% respectively. Moreover, by practicing the process of this invention by using a heteropolytungstic scid as the catalyst, the conversion ratio of cyclohexanone and the yield of cyclohexanone oxime can be increased up to 90% and 92%, respectively.

As the tin-containing compounds soluble in water or in an aqueous solution of ammonia, used in the process of this invention, there are illustrated ortho-stannic acid (α-stannic acid) ($H_2SnO_3 \cdot nH_2$) and the salts thereof, such as potassium α-stannate ($K_2SnO_3 \cdot nH_2O$), sodium α-stannate ($Na_2SnO_3 \cdot nH_2O$), lithium α-stannate $$(Li_2SnO_3 \cdot nH_2O)$$

etc.: metha-stannic acid (β-stannic acid) ($H_2Sn_5O_{11} \cdot nH_2O$) and the salts thereof, such as potassium β-stannate ($K_2Sn_5O_{11} \cdot 4H_2O$), sodium β-stannate ($Na_2Sn_5O_{11} \cdot 8H_2O$), etc.: para-stannic acid ($H_2Sn_5O_{11} \cdot nH_2O$) and the salts thereof, such as, potassium para-stannate $$(K_2Sn_5O_{11} \cdot 2H_2O)$$

etc.; stannous acid ($HSnO_2H$) and the salts thereof, such as, potassium stannite ($K_2SnO_2 \cdot nH_2O$), sodium stannite ($Na_2SnO_2 \cdot nH_2O$), etc.; tin hydroxide and the salts thereof, such as, stannous hydroxide ($Sn(OH)_2$), stannic oxyhydroxide ($SnO(OH)_2$); stannic chloride $$(SnCl_4 \cdot nH_2O)$$

stannous sulfate ($SnSO_4$); stannic sulfate $$(Sn(SO_4)_2 \cdot 2H_2O)$$

tri-stannous n-phosphate ($Sn_3(PO_4)_2$) and the like. A part of the tin compound supplied into the reaction system is oxidized under the reaction conditions, for example, the divalent stannous compound is oxidized with hydrogen peroxide into a tetra-valent stannic compound or further oxidized into a perstannic acid ($H_2SnO_9$) compound.

The above-mentioned tin-containing compound is added into the reaction system in an amount of 0.01–50% by weight, and preferably 1–20% by weight of the catalyst.

As the polyhydroxy alkane having hydroxyl groups at the adjacent carbon atoms, there are illustrated ethylene glycol, 1,2-propylene glycol, 2,3-butylene glycol, isobutylene glycol, 1,2-cyclohexanediol, glycerine, 1,2,3-butanetriol, 2,3,4-pentanetriol, rhamnitol, mannitol, sorbitol, and the like. The proportion of the alcohol addition is 1–500% by weight, and preferably 10–200% by weight of catalyst.

In the process of this invention, the amount of the catalyst, that is, tungstic acid or a derivative thereof is 1–50% by weight, and preferably 10–35% by weight of the cyclohexanone. As the catalyst used in the process of this invention, there are tungstic acid; an isopolytungstic acid, such as, paratungstic acid and methatungstic acid; a heteropolytungstic acid; inorganic water soluble alkaline salts of the acids, such as, ammonium salts, potassium salts, lithium salts and the like; and organic amine salts, such as, pyridine salts, cyclohexylamine salts, and the like.

As mentioned above, paratungstic acid and methatungstic acid may be used as the isopolytungstic acid, which is one of the derivatives of tungstic acid. Paratungstic acid is shown by the formula $$H_{10}(W_{12}O_{46}H_{10}) \cdot nH_2O$$

Methatungstic acid is shown by the formula $$H_6(W_{12}O_{40}H_2) \cdot nH_2O$$

Further, although the atomic number of tungsten in methatungstic acid is the same as in paratungstic acid, the condensation degree of methatungstic acid is higher than that of paratungstic acid.

As another derivative of tungstic acid, there are heteropolytungstic acids which have tungsten as the poly-element and phosphorus, silicon, boron, selenium, or iodine as the hetero-element. In these compounds a part of the tungsten may be replaced with vanadium or molybdenum. For example, there are phosphotungstic acid phosphotungstovanadic acid, phosphotungstomolybdenic acid, selentungstic acid, silicotungstic acid, borotungstic acid, and the inorganic water soluble salts thereof, e.g., ammonium salts, sodium salts, potassium salts, and lithium salts thereof; and organic amine salts, such as pyridine salts and cyclohexylamine salts thereof. Among the heteropolytungstic acids and salts thereof, those in which the atomic ratio of the hetero-element to the poly-element is in the ratio of 1:12, 2:18 and 1:6 are suitable as the catalyst for the process of this invention and in particular, in the case of employing the heteropolytungstic acids such as phosphotungstic acid and borotungstic acid having the atomic ratio of 1:12 or 2:18 as the catalyst, the conversion ratio of cyclohexanone and the yield for cyclohexanone oxime are remarkably improved.

To illustrate the complex catalyst compounds of this invention more specifically, some are shown in the following chemical formulas:

(a) $H_3(PW_{12}O_{40}) \cdot 30H_2O$
(b) $H_4(SiW_{12}O_{40}) \cdot 7H_2O$
(c) $H_5(BW_{12}O_{40}) \cdot 3H_2O$
(d) $Na_3(PW_{12}O_{40}) \cdot 30H_2O$
(e) $H_3(PW_{10}V_2O_{39}) \cdot nH_2O$
(f) $H_4(SeW_{12}O_{40}) \cdot nH_2O$

DESCRIPTION OF PREFERRED EMBODIMENTS

Now, the process of the present invention will be explained below in detail.

The process of this invention may be carried out in an iron, stainless steel, aluminum-lined or glass-lined reactor by a batch system in which cyclohexanone, a solvent, the catalyst, and ammonia (as aqueous ammonia) are charged in the reactor. Hydrogen peroxide and ammonia are continuously introduced into the system with stirring in the presence of the tin-containing compound soluble in water or in an aqueous solution of ammonia or in the presence of the polyhydroxy alkane having hydroxyl groups at adjacent carbon atoms, and then the reaction is completed by the process of stirring the system for a definite period of time or by a one step-type or a multistep-type continuous system.

The detailed reaction conditions are as follows: That is, in the practice of this reaction, it is desirable to use a solvent and as the solvent, water is most desirable but, if necessary, an organic solvent capable of dissolving ammonia other than ketones and aldehydes may be used alone or together with water. As the organic solvents suitable for use in this invention, there are such organic solvents soluble in water as methanol, ethanol, n-propanol, isopropanol, sec-butanol, tert-butanol, etc., or mixtures thereof. In the reaction of this invention, there is no particular limitation on the amount of the solvent and a small amount thereof may be present at the beginning of the reaction. Since two mols of water are produced per one mol of cyclohexanone oxime formed, this acts as the reaction medium to advance the reaction smoothly.

If desired, a condensation inhibitor of cyclohexanone, such as, hydroquinone or various phenol derivatives may be added to the reaction. A yield improving agent, such as, various metal salts, sulfur, sulfides, sulfur-containing organic compounds, various borates, phosphates and the like may also be added to the reaction system. In particular, the metal salt is not only effective as a yield improving agent for cyclohexanone oxime, but also acts as a promotor. Thus, even if the proportion of the catalyst in the reaction system in this invention is reduced to some extent, the reduction in the yield of cyclohexanone oxime caused by the reduction of catalyst is prevented.

As the metals for these metal salts, there are Cu, Ag, Zn, Cd, Hg, Ti, Zr, V, Cr, Mo, U, Th, Mn, Fe, Co, Ni, Pd, Pt, etc. The metal salts are soluble or partially soluble inorganic acid salts, organic acid salts, bases, and oxyacid salts thereof. Further, it is effective to add the salts of Ag, Cu, Mn, Pd and Pt to the reaction system in an amount of 0.002–0.04% by weight (as metal) of the catalyst; Ni, Fe, Mo, Hg and Co in an amount of 0.01–0.5% by weight; and Zn, Cd, Ti, Zr, U and Th in an amount of 2–50% by weight. However, it is desired not to use an excessive amount of the metal salt, since the decomposition of hydrogen peroxide is promoted thereby.

Further, as the sulfides and sulfur-containing organic compounds useful as the yield-improving agents in this invention, there are illustrated ammonium sulfide, ammonium polysulfide, sodium sulfide, potassium polysulfides, disulfides such as ethyl disulfide, thioethers such as isopropyl thioether and diazothioether, thiazoles, mercaptans, phenothiazine and derivatives thereof, and thiophene and derivaties thereof. It is effective to use these compounds in general, in amounts of 0.0001–0.1% by weight to the amount of cyclohexanone. Also, as the water-soluble borates and phosphates having similar action as the above-mentioned sulfur compounds, there are alkali metal salts and ammonium salts of boric acid, diboric acid, borous acid, phosphoric acid, pyrophosphoric acid, methaphosphoric acid, tripolyphosphoric acid, acid phosphoric acid and the like, and it is effective to add these salts in an amount of 0.01–20% by weight of the amount of cyclohexanone.

The process of this invention may be more profitably conducted by adding into the reaction system a sulfate as an agent for improving the reaction rate of cyclohexanone besides the above mentioned various additives, As the sulfates used in the present invention, ammonium sulfate is particularly preferable but there are other soluble salts, such as, potassium sulfate, sodium sulfate, acid potassium sulfate, acid sodium sulfate and the like. Further, in the process of this invention, an acid capable of forming a soluble sulfate when added in the reaction liquid, such as, sulfuric acid may be employed instead of using the sulfate.

The amount of the sulfate to be added to the reaction system is 0.01–5.0 parts by weight preferably 0.05–2.5 parts by weight per one part by weight of the catalyst, i.e., tungstic acid or a derivative thereof, and further it is preferable that in the case of employing an ammonium salt, such as, ammonium sulfate and acid ammonium sulfate as the sulfate, the amount is 0.5–3 parts by weight per one part of the catalyst. In the case of employing other salts than ammonium salts as the sulfate, the amount is 0.1–1 part by weight. At that, the addition of an excessive amount of the sulfate is undesirable, since the insolubilization of the catalyst and the decomposition of hydrogen peroxide are promoted thereby.

The reaction of this invention may be conducted in the manner wherein (1) the tin-containing compound, soluble in water or an aqueous solution of ammonia or the alcohol having hydroxyl groups at the adjacent atoms, (2) cyclohexanone and (3) the catalyst are dissolved in a solvent containing, if desired, the above-mentioned various additives. An excessive amount of ammonia gas is blown into the resulting solution or concentrated aqueous ammonia is added to said solution. Then, an aqueous hydrogen peroxide solution is added dropwise into the reaction system while supplying ammonia.

According to another procedure, the tin-containing compound soluble in water or in an aqueous solution of ammonia or the polyhydroxy alkane having hydroxyl groups at adjacent carbon atoms and the catalyst are dissolved in a solvent. An excessive amount of ammonia gas is blown into the resulting solution or concentrated aqueous ammonia is added into the solution. Then, aqueous hydrogen peroxide and cyclohexanone are added dropwise into the system while supplying ammonia. In addition, it is of course desirable to stir the system forcibly in any case.

As the reaction progresses, the colorless reaction liquid becomes faint yellow-green. This is caused by the oxidation of tungstic acid or the anion of the polytungstic acid, which is the catalyst of the reaction system. After the reaction is finished, the reaction liquid becomes colorless again. When water is employed as the solvent, while cyclohexanone oxime begins to precipitate as the reaction proceeds, the precipitates are agglomerated into particles of masses, and then as the reaction proceeds further, the fine particles of cyclo hexanone oxime disperse in the reaction liquid, at which point the reaction is finished. In the case where the reaction does not proceed sufficiently, fine oil drops are floated in the reaction liquid after the end of the reaction. Further, in such cases where the amount of catalyst is insufficient, the reaction temperature is too low, and the amount of existing ammonia is insufficient in the reaction system while hydrogen peroxide is being supplied, cyclohexanone reacts with hydrogen peroxide to form white acicular crystals of cyclohexanone peroxide. This reduces remarkably the yield of cyclohexanone oxime. The theoretical amount of hydrogen peroxide is one mol to one mol of cyclohexanone, but it is preferable that the amount be slightly larger than the equivalent. This is, it is preferable that the amount of hydrogen peroxide be 1.5 mols per one mol of cyclohexanone and that the concentration of the hydrogen peroxide solution added to the system be 10–60% by weight and preferably 20–40% by weight. The reaction temperature is 5–50° C. and preferably 10–30° C., since if the reaction temperature is lower than 5° C., the reaction rate is lowered and if it is higher than 40° C., the selectivity is reduced. The reaction period is, in a batch system, usually 30–360 minutes. This time is required to add the hydrogen peroxide solution. About 5–60 minutes additional stirring time is required to finish the subsequent reaction. In a continuous system, an adequate total reaction period is 60–600 minutes. The ammonia added to the reaction system may be gaseous ammonia or an aqueous ammonia, but in any case it is necessary that free ammonia always be present in the reaction system during reaction. The amount of ammonia throughout the reaction is stoichiometrically one mol per one mol of cyclohexanone, but from the viewpoint of rate of reaction, it is desirable to use an excessive amount of ammonia and usually more than 1.5 mols per one mol of cyclohexanone is used. If hydrogen peroxide is added into the reaction mixture in which an excessive amount of ammonia is not present, side reactions, such as, the formation of cyclohexanone peroxide occur remarkably. Hence, it is necessary that an excessive amount of ammonia be present in the reaction system at the beginning of reaction.

In the case of carrying out the process of this invention continuously by using a plurality of reactors, it is preferable from the viewpoint of the conversion ratio of cyclohexanone and the yield for cyclohexanone oxime that hydrogen peroxide be separately supplied to each reactor, such that the amount of hydrogen peroxide supplied in the preceding reactor is larger than that of the subsequent reactor. In this way the ratio of cyclohexanone to hydrogen peroxide is larger in the preceding reactor. Further, it is desirable from the viewpoint of yield of cyclohexanone oxime and the effective utilization of the catalyst that after separating the greater part of cyclohexanone oxime from the reatcion product liquid, the remaining aqueous solution containing the catalyst, ammonia and hydrogen peroxide be used again as the solvent, without decomposing the ammonia and hydrogen peroxide.

In order to recover the thus formed cyclohexanone oxime in the process of this invention, after the end of the oxidation reaction, an extracting agent for the organic components, such as, benzene, cyclohexane, chloroform or carbon tetrachloride is added to the reaction liquid to form an organic phase, an aqueous phase, and a solid phase. The thus formed cyclohexanone oxime and unreacted cyclohexanone are almost all transferred into the organic phase. Thereafter, the cyclohexanone oxime may be recovered from the organic phase in the conventional manner. On the other hand, since the aqueous phase still contains ammonia, some amounts of cyclohexanone, cyclohexanone oxime and still active catalyst, it is returned to the reactor or reactors again after removal of a part of the water. The solid phase mainly consists of the decomposition products of the catalyst and is recovered for reuse as the effective catalyst.

The present invention will now be explained by reference to the following examples but it should be understood that the invention is not limited to them. In addition, in the specification, the conversion ratio of cyclohexanone and the yield for cyclohexanone oxime are shown by mol percent, the proportions of components are shown by percent by weight, and the term part(s) means part(s) by weight. Further, in the following examples, the analysis of cyclohexanone and cyclohexanone oxime is all conducted by means of gas chromatography.

lyst was found to be 0.2 g., which was less than 0.1% of the amount of the supplied catalyst.

EXAMPLES 2–13 AND COMPARATIVE EXAMPLES 1–3

The same procedure as in Example 1 was repeated using the catalysts and the tin compounds shown in Table 1 instead of the 10 g. of sodium α-stannate and 200 g. of phosphotungstic acid. The conversion ratio of thus obtained cyclohexanone and the yield for cyclohexanone oxime are also shown in Table 1 together with the amount of the precipitates of the insolubilized catalyst.

TABLE 1

| Catalyst and proportion | Conversion rates of cyclohexanone, percent | Yield of cyclohexanone oxime, percent | Amount of precipitated catalyst, g. |
|---|---|---|---|
| Example No.: | | | |
| 2. Ammonium phosphotungstic acid (($NH_4$)$_3PO_4 \cdot 12WO_3 \cdot 3H_2O$) (200 g.) plus β-stannic acid ($H_2Sn_5O_{11} \cdot 4H_2O$) (0.5 g.). | 89.2 | 92.1 | 1.2 |
| 3. Sodium phosphotungstic acid ($2Na_2O \cdot P_2O_5 \cdot 12WO_3 \cdot 18H_2O$) (200 g.) plus potassium β-stannate ($K_2Sn_5O_{11} \cdot 4H_2O$) (20 g.) plus ammonium sulfate (200 g.). | 94.1 | 91.5 | 6.4 |
| 4. Tungstic acid ($H_2WO_4 \cdot H_2O$) (250 g.) plus sodium β-stannate ($Na_2Sn_5O_{11} \cdot 8H_2O$) (10 g.). | 88.1 | 82.2 | 5.4 |
| 5. Sodium tungstate ($Na_2WO_4 \cdot 2H_2O$) (250 g.) plus lithium β-stannate ($Li_2SnO_3 \cdot 3H_2O$) (3 g.) plus ammonium sulfate (200 g.). | 93.6 | 89.4 | 8.2 |
| 6. Ammonium p-tungstate ($5(NH_4)_2O \cdot 12WO_3 \cdot 5H_2O$) (200 g.) plus sodium α-stannate ($Na_2SnO_3 \cdot 3H_2O$) (10 g.). | 87.2 | 84.5 | 11.2 |
| 7. Borotungstic acid ($H_5BW_{12}O_{40} \cdot 30H_2O$) (250 g.) plus sodium α-stannate ($Na_2SnO_3 \cdot 3H_2O$) (0.5 g.). | 87.3 | 85.6 | 2.1 |
| 8. Silicotungstic acid ($H_4SiW_{12}O_{40} \cdot 7H_2O$) (200 g.) plus p-stannic acid ($H_2Sn_5O_{11} \cdot 7H_2O$) (5 g.). | 89.1 | 86.7 | 7.2 |
| 9. Phosphotungstic acid ($H_3PW_{12}O_{40} \cdot 30H_2O$) (200 g.) plus potassium α-stannate ($K_2SnO_3 \cdot 3H_2O$) (1 g.). | 89.1 | 88.3 | 4.2 |
| 10. Phosphotungstic acid ($H_3PW_{12}O_{40} \cdot 3H_2O$) (200 g.) plus stannic sulfate ($Sn(SO_4)_2 \cdot 2H_2O$) (20 g.). | 93.1 | 90.5 | 5.9 |
| 11. Phosphotungstic acid ($H_3PW_{12}O_{40} \cdot 3H_2O$) (200 g.) plus stannous phosphate ($Sn_3(PO_4)_2$) (10 g.). | 92.1 | 88.5 | 10.2 |
| 12. Phosphotungstic acid ($H_3PW_{12}O_{40} \cdot 3H_2O$) (200 g.) plus potassium stannite ($K_2SnO_2$) (20 g.). | 90.5 | 90.5 | 4.1 |
| 13. Phosphotungstic acid ($H_3PW_{12}O_{40} \cdot 3H_2O$) (200 g.) plus sodium stannite ($Na_2SnO_2$). | | | |
| Comparative Example No.: | | | |
| 1. Phosphotungstic acid (200 g.) ($H_2PW_{12}O_{40} \cdot 30H_2O$) | 89.3 | 81.6 | 129 |
| 2. Tungstic acid (250 g.) ($H_2WO_4 \cdot 2H_2O$) | 64.9 | 69.2 | 266 |
| 3. Sodium α-stannate (10 g.) ($Na_2SnO_3 \cdot 3H_2O$) | | 0 | |

The conversion ratio of cyclohexanone is:

$$\frac{\text{Converted cyclohexanone (mol)}}{\text{Charged cyclohexanone (mol)}} \times 100, \text{ and}$$

The yield for cyclohexanone oxime is:

$$\frac{\text{Formed cyclohexanone oxime (mol)}}{\text{Converted cyclohexanone (mol)}} \times 100$$

EXAMPLE 1

Into a reactor equipped with a stirrer and cooling jacket, 1500 g. of 28% aqueous ammonia, 600 g. of water, 200 g. of phosphotungstic acid ($H_3PW_{12}O_{40} \cdot 30H_2O$), and 10 g. of sodium α-stannate ($Na_2SnO_3 \cdot 3H_2O$) were added. Thereafter, 600 g. of cyclohexanone was added. Gaseous ammonia was blown into the resulting solution at a normal pressure and at a rate of 1200 cc./min. Then, while maintaining the temperature of the system at 18° C., 910 g. of 30% hydrogen peroxide was supplied at a rate of 260 g./hr. over a 3.5-hour period. In this example, the amount of hydrogen peroxide was 1.31 mols per one mol of supplied cyclohexanone and the reaction was continued for 30 minutes after the end of the introduction of hydrogen peroxide. The reaction product mainly consisted of a white solid layer of granules mainly consisting of cyclohexanone oxime and an aqueous layer. By adding 3,000 g. of benzene into the system, the reaction product was separated into a benzene phase containing cyclohexanone oxime and unreacted cyclohexanone, an aqueous phase containing ammonia and the catalyst, and a solid phase containing insolubilized catalyst components. By analysis of a benzene phase and an aqueous phase, the conversion ratio of cyclohexanone in this example was found to be 90.1%, the yield for cyclohexanone oxime to the consumed cyclohexanone was found to be 92.4% and the amount of the precipitates of the insolubilized catalyst was found to be 0.2 g., which was less than 0.1% of the amount of the supplied catalyst.

EXAMPLE 14

Into a reactor equipped with a stirrer and a cooling jacket, 1100 g. of 28% aqueous ammonia, 20 g. of phosphotungstic acid, and 100 g. of glycerine were added, and, thereafter, 600 g. of cyclohexanone was added into the solution. Then, while maintaining the system at 18° C., gaseous ammonia was blown into the system at normal pressure and at a rate of 600 cc./min. Simultaneously 900 g. of 30% hydrogen peroxide was supplied at a rate of 225 g./hr. over a four hour period. After the addition of hydrogen peroxide, the system was further stirred for 20 minutes. The amount of hydrogen peroxide supplied in this example was 1.3 mol per one mol of cyclohexanone supplied. The reaction product mainly consisted of granular cyclohexanone oxime and an aqueous phase. By adding 3000 g. of benzene therein, it was separated into a benzene phase, containing cyclohexanone oxime and unreacted cyclohexanone, a small proportion of solid phase, mainly consisting of the white precipitate of the insolubilized catalyst component, and an aqueous phase containing ammonia and the catalyst. By the analysis of the benzene phase and the aqueous phase, the conversion ratio of cyclohexanone was found to be 91.8%, the yield for cyclohexanone oxime was found to be 92.1%, and the amount of the insolubilized catalyst was found to be 0.1 g., which was 0.05% of the amount of supplied catalyst.

EXAMPLES 15–22 AND COMPARATIVE EXAMPLES 4–5

The same procedure as in Example 14 was repeated using various catalysts and additives shown in Table 2 instead of 200 g. of phosphotungstic acid and 100 g. of glycerine, the results of which are shown in Table 2.

TABLE 2

| Catalyst and proportion | Additives and proportion | Conversion rates of cyclohexanone percent | Yield of cyclohexanone oxime, percent | Amount of precipitated catalyst, g. |
|---|---|---|---|---|
| Example No.: | | | | |
| 15 ............ Tungstic acid ($H_2WO_4 \cdot H_2O$) (200 g.) | Glycerine (300 g.) | 91.7 | 90.2 | 0.5 |
| 16 ............ Borotungstic acid ($H_3BW_{12}O_{40} \cdot 3H_2O$) (300 g.) | Ethylene glycol (200 g.) | 88.6 | 82.2 | 12.3 |
| 17 ............ Sodium phosphotungstate ($2Na_2O \cdot P_2O_5 \cdot 12WO_3 \cdot 18H_2O$) (200 g.) | 1,2-propylene glycol (100 g.) | 92.3 | 90.4 | 6.8 |
| 18 ............ Phosphotungstic acid ($H_3PW_{13}O_{40} \cdot 3H_2O$) (200 g.) | Mannitol (50 g.) | 90.2 | 91.8 | 2.3 |
| 19 ............ do | 1,2-cyclohexanone diol (100 g.) | 91.8 | 89.7 | 14.1 |
| 20 ............ do | 1,2,3-butane triol (200 g.) | 89.7 | 90.9 | 2.5 |
| 21 ............ Silicotungstic acid ($H_4SiW_{13}O_{40} \cdot 7H_2O$) (200 g.) | 2,3,4-pentane triol (100 g.) | 86.5 | 82.7 | 8.5 |
| 22 ............ Phosphotungstic acid (200 g.) ($H_3PW_{13}O_{40} 3H_2O$) ammonium sulfate (200 g.). | Glycerine | 93.1 | 92.7 | 3.4 |
| Comparative Example No.: | | | | |
| 4 ............ Tungstic acid (200 g.) ($H_2WO_4 \cdot H_2O$) | 1,6-hexane diol (100 g.) | 85.3 | 72.4 | 157 |
| 5 ............ Phosphotungstic acid ($H_3PW_{13}O_{40} 3H_2O$) (200 g.) | 1,3-butane diol (100 g.) | 89.7 | 82.3 | 118 |

What is claimed is:

1. A process for the production of cyclohexanone oxime by the ammoxidation of cyclohexanone with ammonia and hydrogen peroxide using a catalyst selected from the group consisting of tungstic acid, heteropolytungstic acids, isopolytungstic acids and inorganic water soluble alkaline salts and soluble organic amine salts thereof selected from the group consisting of pyridine and cyclohexylamine in an amount of from 1 to 50% by weight of the amount of cyclohexanone, which comprises conducting said ammoxidation at a temperature of from 5 to 50° C. in the presence of from 1 to 500% by weight based on the catalyst of a polyhydroxy alkane having hydroxyl groups at adjacent carbon atoms and containing from 2 to 6 carbon atoms.

2. A process for the production of cyclohexanone oxime by the ammoxidation of cyclohexanone with ammonia and hydrogen peroxide using a catalyst selected from the group consisting of tungstic acid, heteropolytungstic acids, is isopolytungstic acids, and inorganic water soluble alkaline salts and soluble organic amine salts thereof selected from the group consisting of pyridine and cyclohexylamine, in an amount of from 1 to 50% by weight of the amount of the cyclohexanone, which comprises conducting said ammoxidation at a temperature of from 5 to 50° C. in the presence of from .01 to 5.0% by weight based on the catalyst of soluble sulfate selected from the group consisting of potassium sulfate, sodium sulfate, acid potassium sulfate, acid sodium sulfate and ammonium sulfate, and from 1 to 500% by weight of said catalyst of a polyhydroxy alkane having hydroxyl groups at adjacent carbon atoms and containing from 2–6 carbon atoms.

3. The process as claimed in claim 1 wherein said alcohol is present in an amount of from 10 to 200% by weight of said catalyst.

4. The process of claim 1 wherein said catalyst is present in an amount of from 10 to 35% by weight based on the cyclohexanone.

5. The process is claimed in claim 2 wherein the amount of said alcohol is from 10 to 200% by weight of said catalyst.

6. The process as claimed in claim 2 wherein the amount of said catalyst is from 10 to 35% by weight based on the cyclohexanone.

7. The process as claimed in claim 2 wherein said sulfate is ammonium sulfate.

8. The process of claim 1, wherein said alcohol is ethylene glycol.

9. The process of claim 2, wherein said alcohol is ethylene glycol.

10. The process of claim 1, wherein said alcohol is 1–2 propylene glycol.

11. The process of claim 2, wherein said alcohol is 1–2 propylene glycol.

12. The process of claim 1 whrein said alcohol is 1–2 cyclohexanone diol.

13. The process of claim 2, wherein said alcohol is 1–2 cyclohexanone diol.

14. The process as claimed in claim 1 wherein said alcohol is glycerine.

References Cited

UNITED STATES PATENTS 2,718,528  9/1955  Pieper _____ 260—566A
2,706,204  4/1955  Kahr _____ 260—566A

OTHER REFERENCES

Lewis et al.: "J. App. Chem.," vol. 10, p. 403 (1960).
Lebedev et al.: "Chem. Abst.," vol. 55, col. 1473(a) (1961).
Kahr: "Angew Chem.," vol. 72, pp. 135 and 137 (1960).

BERNARD HELFIN, Primary Examiner

GERALD A. SCHWARTZ, Assistant Examiner